(12) United States Patent
Hosen

(10) Patent No.: US 9,765,893 B2
(45) Date of Patent: Sep. 19, 2017

(54) DUST COVER FOR BALL JOINT

(71) Applicant: NOK CORPORATION, Tokyo (JP)

(72) Inventor: Tatsuro Hosen, Makinohara (JP)

(73) Assignee: NOK Corporation (JP)

( * ) Notice: Subject to any disclaimer, the term of this patent is extended or adjusted under 35 U.S.C. 154(b) by 109 days.

(21) Appl. No.: 14/437,960

(22) PCT Filed: Sep. 13, 2013

(86) PCT No.: PCT/JP2013/074806
§ 371 (c)(1),
(2) Date: Apr. 23, 2015

(87) PCT Pub. No.: WO2014/065037
PCT Pub. Date: May 1, 2014

(65) Prior Publication Data
US 2015/0300502 A1    Oct. 22, 2015

(30) Foreign Application Priority Data
Oct. 25, 2012    (JP) .................. 2012-235218

(51) Int. Cl.
*F16C 11/06* (2006.01)
*F16J 15/52* (2006.01)
(Continued)

(52) U.S. Cl.
CPC .............. *F16J 15/52* (2013.01); *B60G 7/005* (2013.01); *B62D 7/163* (2013.01); *F16C 11/06* (2013.01); *F16C 11/0671* (2013.01); *F16J 3/042* (2013.01); *B60G 2204/416* (2013.01); *F16C 11/0628* (2013.01); *F16C 2326/05* (2013.01); *F16C 2326/24* (2013.01)

(58) Field of Classification Search
CPC ... F16C 11/0666; F16C 11/00; F16C 11/0695; F16C 11/06; F16J 15/52
See application file for complete search history.

(56) References Cited

U.S. PATENT DOCUMENTS

| | | | | |
|---|---|---|---|---|
| 4,220,418 A | * | 9/1980 | Kondo | ..................... B62D 7/18 277/391 |
| 5,004,248 A | * | 4/1991 | Messenger | ........... F16J 15/3256 277/351 |

(Continued)

FOREIGN PATENT DOCUMENTS

| | | |
|---|---|---|
| DE | 10-207779 C1 | 10/2003 |
| DE | 102006006799 A1 | 9/2006 |

(Continued)

OTHER PUBLICATIONS

Extended European Search Report for Application No. EP 13 849 598.1 dated Nov. 13, 2015 (8 pages).

*Primary Examiner* — Vishal Patel
*Assistant Examiner* — Thomas Neubauer
(74) *Attorney, Agent, or Firm* — Harness, Dickey & Pierce, P.L.C.

(57) ABSTRACT

A ball joint dust cover is provided. The ball joint dust cover is made of a rubbery elastic material and is provided with a small diameter opening part with which a hard ring is formed. The hard ring is sandwiched by a retainer having a three-sided box shape. The retainer includes a plurality of gaskets contacting the hard ring.

3 Claims, 7 Drawing Sheets

(51) Int. Cl.
  *F16J 3/04*   (2006.01)
  *B60G 7/00*   (2006.01)
  *B62D 7/16*   (2006.01)

(56) References Cited

U.S. PATENT DOCUMENTS

| | | | | |
|---|---|---|---|---|
| 6,305,483 | B1 * | 10/2001 | Portwood | E21B 10/25 |
| | | | | 175/371 |
| 8,714,861 | B2 * | 5/2014 | Bernhardt | F16C 11/0633 |
| | | | | 277/635 |
| 2004/0028302 | A1 | 2/2004 | Abels et al. | |
| 2010/0260538 | A1 | 10/2010 | Brunneke | |

FOREIGN PATENT DOCUMENTS

| | | |
|---|---|---|
| DE | 102008043248 A1 | 5/2010 |
| JP | S55-022520 U | 2/1980 |
| JP | S62-137408 A | 6/1987 |
| JP | S63-175359 U | 11/1988 |
| JP | 2011-503476 A | 1/2011 |

* cited by examiner

DUST COVER FOR BALL JOINT

CROSS-REFERENCE TO RELATED APPLICATIONS

This application is a 371 U.S. National Stage Application of International Application No. PCT/JP2013/074806, filed on Sep. 13, 2013, and published in Japanese as WO 2014/065037 A1 on May 1, 2014. This application claims priority to Japanese Application No. 2012-235218, filed on Oct. 25, 2012. The entire disclosures of the above applications are incorporated herein by reference.

BACKGROUND OF THE INVENTION

Field of the Invention

The present invention relates to a dust cover for a ball joint.

Further, the present invention relates to a dust cover for a ball joint which is used in an automobile suspension device, and a steering device.

Description of the Conventional Art

Conventionally, as a ball joint to which a dust cover is installed for the purpose of a dust prevention and a water prevention in a ball joint coupling portion, there has been known a dust cover for a ball joint which is described in FIG. 11 (Japanese Unexamined Patent Publication No. 62-137408).

In a seal structure of this kind of ball joint dust cover, a spherical head portion 200 formed in one end of a ball stud 100 is retained within a socket 300.

Further, a shaft 400 in the other end of the ball stud 100 is fastened and fixed to a knuckle 500.

On the other hand, a one end large-diameter opening portion 800 having an approximately C-shaped cross sectional shape of a dust cover 600 made of an elastic material is fixed and retained within an annular groove portion 310 which is formed in an outer peripheral surface of the socket 300 by an annular pressure ring 700, and the other end small-diameter opening portion 150 is retained to the shaft 400.

The pressure ring 700 employs a circlip which approximately has a rectangular cross sectional shape.

In this kind of conventional dust cover 600 made of the elastic material, in the case that the ball stud 100 oscillates in a state in which the ball stud 100 is inclined as shown in FIG. 11, a force extending the small-diameter opening portion 150 is applied in a side in which a film portion of the dust cover 600 made of the elastic material extends (a right side on the drawing). Therefore, there is generated a so-called mouth opening phenomenon of the small-diameter portion 150 in which a lip portion of the small-diameter opening portion 150 and the knuckle 500 is disconnected.

As a result, a seal performance in the small-diameter portion 150 is lowered, and a problem that sedimentation or garbage enters into the dust cover 600 from an external portion has been brought about.

Particularly, the rubber constructing the dust cover 600 made of the elastic material loses an elasticity under a low-temperature atmosphere, and a following property of the film portion is lowered in relation to an oscillating motion of the ball joint. As a result, it has been known that the mouth opening phenomenon in which the seal lip portion moves away from the shaft 400 is remarkably generated.

As one of methods for taking measures to the phenomenon, there has been attempts to improve the sealing performance by fitting a retainer having an L-shaped cross section to an outer peripheral surface of the ball stud and closely attaching the dust lip provided in the small-diameter opening portion to the retainer side. However, the mouth opening phenomenon can not be sufficiently resolved.

SUMMARY OF THE INVENTION

Problem to be Solved by the Invention

The present invention is made by taking the problem mentioned above into consideration, and an object of the present invention is to provide a dust cover for a ball joint which can suppress generation of a so-called mouth opening phenomenon in a small-diameter opening portion even under a low-temperature atmosphere, can effectively inhibit a seal performance from being lowered in the small-diameter opening portion and inhibit the sedimentation or the garbage from entering into a dust cover from an external portion, and has a good sealing performance.

Means for Solving the Problem

A dust cover for a ball joint according to the present invention is a dust cover for a ball joint structured such that a spherical head portion formed in one end of a ball stud is retained within a socket, a shaft in the other end of the ball stud is fastened and fixed to a knuckle, a one end large-diameter opening portion is fixed and retained to an outer peripheral surface of the socket, the other end small-diameter portion having a rigid ring integrally formed therein is retained to the shaft, having a film portion which connects the one end large-diameter opening portion and the other end small-diameter opening portion, and made of a rubber-like elastic material, wherein the rigid ring approximately has a rectangular shape in its cross section, and is structured such that one end of the film portion is connected to an outer peripheral surface side of the rigid ring, and the rigid ring is exposed at least in its inner peripheral surface, a first end surface in the socket side and a second end surface in the knuckle side, the dust cover for the ball joint comprises a retainer having a cylinder portion which is fitted and fixed to the shaft outer peripheral surface and is provided with an outer peripheral surface facing to the inner peripheral surface, a first flange portion which is provided with an upper end surface facing to the first end surface, and a second flange portion which is provided with a lower end surface facing to the second end surface, and the retainer has at least two kinds of gaskets among three kinds of gaskets including a first gasket which is integrally bonded to the outer peripheral surface coming into contact with the inner peripheral surface in a sealing manner and is made of a rubber-like elastic material, a second gasket which is integrally bonded to the upper end surface coming into contact with the first end surface in a sealing manner and is made of a rubber-like elastic material, and a third gasket which is integrally bonded to the lower end surface coming into contact with the second end surface in a sealing manner and is made of a rubber-like elastic material.

Effect of the Invention

The present invention achieves effects described below.

According to the dust cover for the ball joint of the invention described in the first aspect, the dust cover for the ball joint is structured such that the rigid ring is pinched by the retainer having the C-shaped cross section. As a result, it is possible to securely suppress generation of the mouth-opening phenomenon of the small-diameter opening portion, and it is possible to more effectively inhibit the seal performance from being lowered in the small-diameter opening portion and inhibit the sedimentation or the garbage from entering into the dust cover from the external portion.

Further, according to the dust cover for the ball joint of the invention described in the second aspect, the material of the gasket is set to a silicone rubber. As a result, it is possible to effectively suppress generation of the so-called mouth opening phenomenon of the small-diameter opening portion even under the low-temperature atmosphere.

Further, according to the dust cover for the ball joint of the invention described in the third aspect, the rigid ring is pinched by the retainer having the L-shaped cross section and the knuckle. As a result, it is easy to assemble the retainer, it is possible to suppress generation of the so-called mouth opening phenomenon of the small-diameter opening portion even under the low-temperature atmosphere, and it is possible to effectively inhibit the seal performance from being lowered in the small-diameter opening portion, and inhibit the sedimentation or the garbage from entering into the dust cover from the external portion.

Further, according to the dust cover for the ball joint of the invention described in the fourth aspect, the dust lip coming into contact with knuckle in the sealing manner and made of the rubber-like elastic material is integrally bonded to the second end surface side of the rigid ring. As a result, it is easy to assemble the retainer, and it is possible to more effectively inhibit the sedimentation or the garbage from entering into the dust cover from the external portion.

DETAILED DESCRIPTION OF PREFERRED EMBODIMENTS

Figure 1:
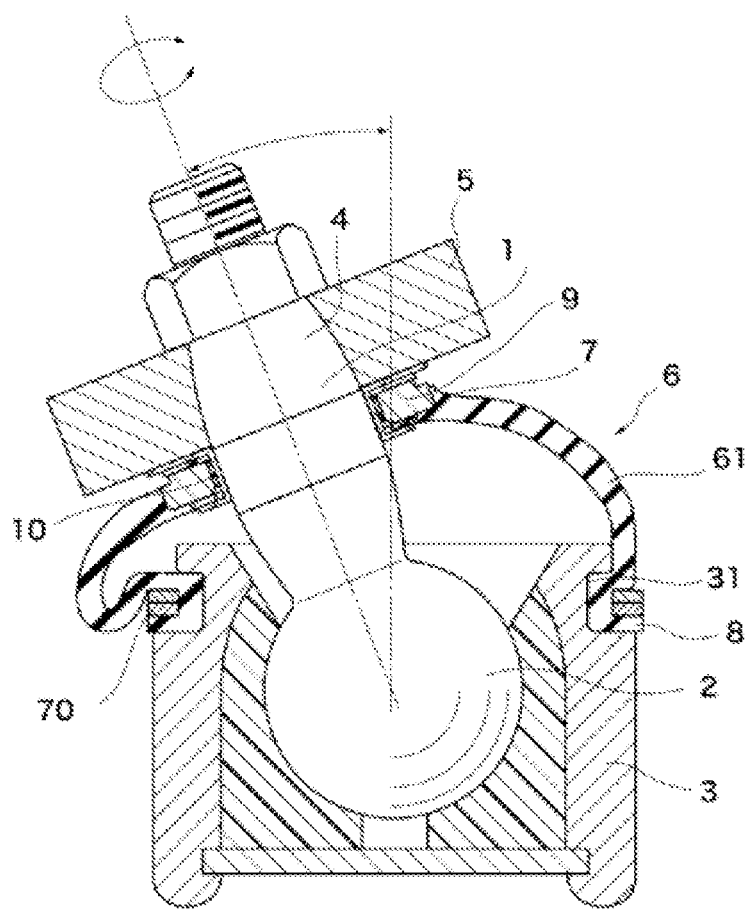
FIG. 1 is a vertical cross sectional view of a dust cover for a ball joint according to the present invention.

A description will be given below of an embodiment for carrying out the present invention.

As shown in FIGS. 1 to 4, a dust cover for a ball joint according to the present invention is basically structured such that a spherical head portion 2 formed in one end of a ball stud 1 is retained within a socket 3, a shaft 4 in the other end of the ball stud 1 is fastened and fixed to a knuckle 5, a one end large-diameter opening portion 8 is fixed and retained to an outer peripheral surface of the socket 3, the other end small-diameter portion 7 having a rigid ring 9 integrally formed therein is retained to the shaft 4, and a film portion 61 is provided for connecting the one end large-diameter opening portion 8 and the other end small-diameter opening portion 7.

Figure 2:
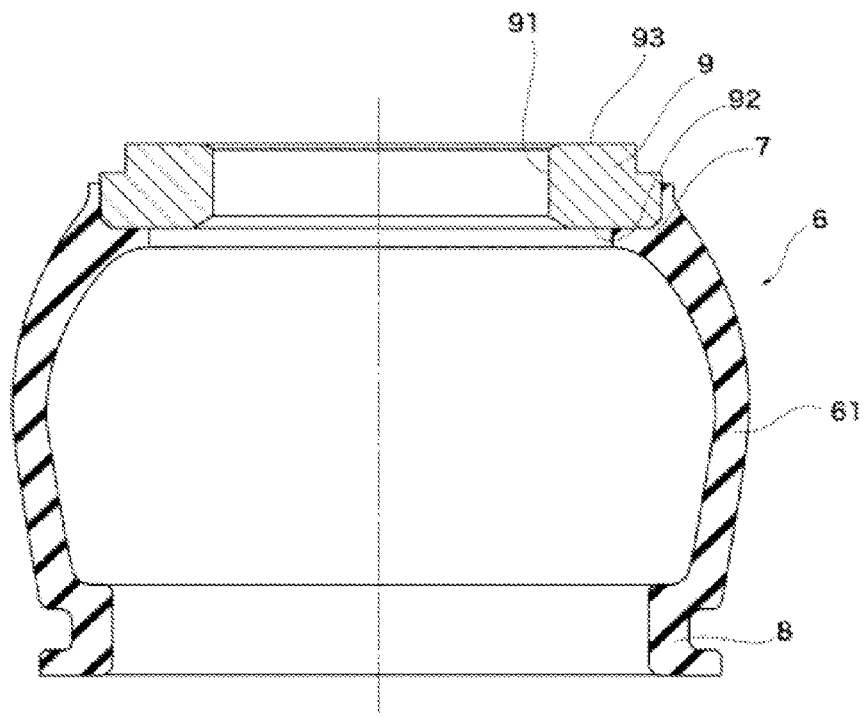
FIG. 2 is a vertical cross sectional view of a dust cover single body shown in FIG. 1 before being installed.

Further, as shown in FIG. 2, the rigid ring 9 approximately has a rectangular cross section, one end of a film portion 61 is connected to an outer peripheral surface side of the rigid ring 9, and the rigid ring 9 is structured such as to be exposed at least in an inner peripheral surface 92, a first end surface 92 in the socket 3 side, and a second end surface 93 in the knuckle 5 side.

As a material of the rigid ring 9, metal materials and various resin materials are appropriately selected and employed.

Figure 3:
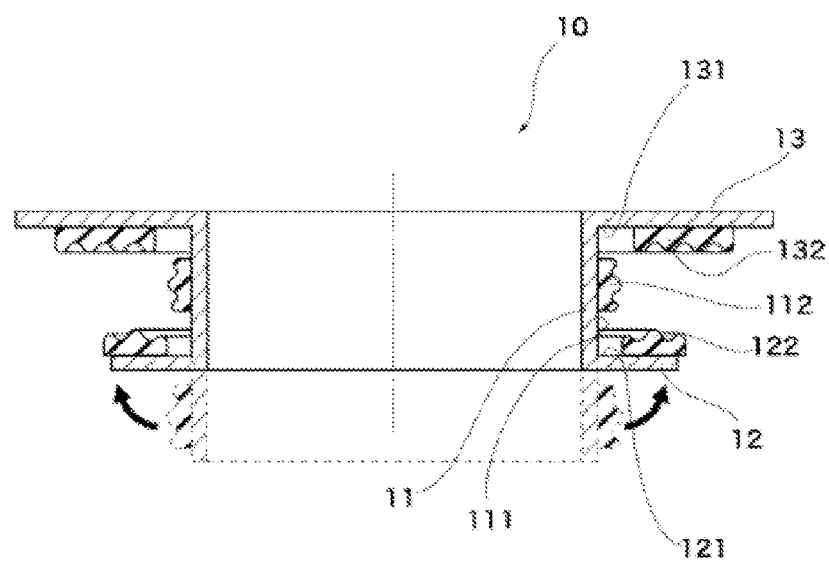
FIG. 3 is a vertical cross sectional view of a retainer single body shown in FIG. 1 before being assembled.
Figure 4:
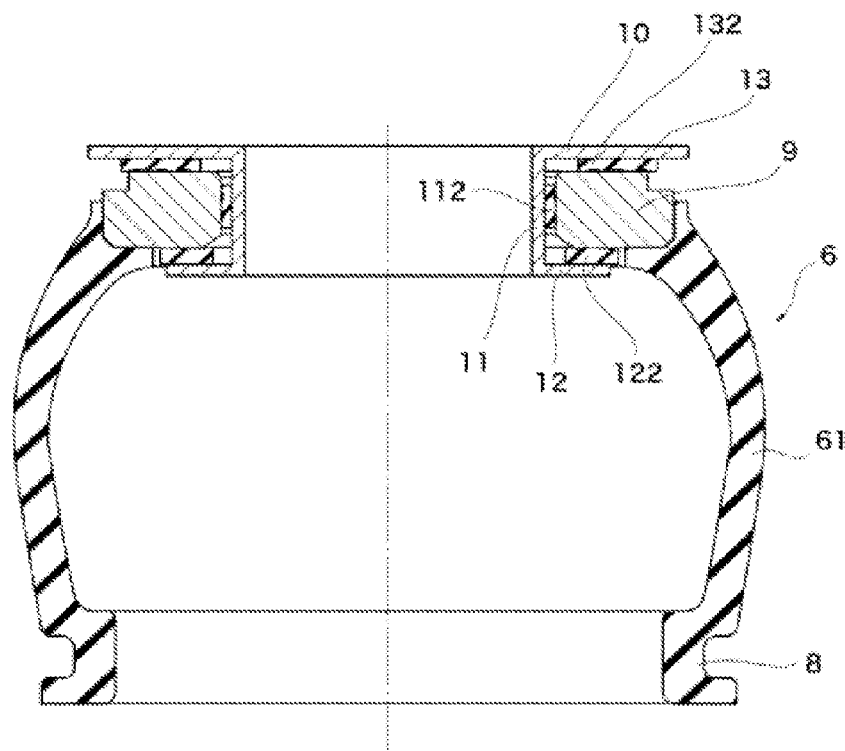
FIG. 4 is a vertical cross sectional view of a state in which the retainer in FIG. 3 is assembled in the dust cover in FIG. 2.

Further, a retainer 10 shown in FIG. 3 is assembled in the rigid ring 9 as shown in FIG. 4, and is thereafter fitted and fixed to an outer peripheral surface of the shaft 4 as shown in FIG. 1.

The retainer 10 has a cylinder portion 11 which is provided with an outer peripheral surface 11 facing to an inner peripheral surface 91, a first flange portion 12 which is provided with an upper end surface 121 facing to a first end surface 92, and a second flange portion 13 which is provided with a lower end surface 131 facing to a second end surface 93. The retainer 10 is provided with a first gasket 112 which is integrally bonded to an outer peripheral surface 111 coming into contact with the inner peripheral surface 91 in a sealing manner and is made of a rubber-like elastic material, a second gasket which is integrally bonded to an upper end surface 121 coming into contact with the first end surface 91 in a sealing manner and is made of a rubber-like elastic material, and a third gasket 132 which is integrally bonded to a lower end surface 131 coming into contact with the second end surface 93 in a sealing manner and is made of a rubber-like elastic material. In other words, the retainer 10 is provided with three kinds of gaskets 112, 122 and 132.

A method of assembling the retainer 10 shown in FIG. 3 in the rigid ring 9 as shown in FIG. 4 is structured such that the rigid ring 9 is enwrapped by the retainer as shown in FIG. 4 by inserting the rigid ring 9 onto the retainer 10 in a state in which the first flange portion 12 extends downward in an axial direction as shown by a broken line in FIG. 3, and next folding the first flange portion 12 to an outer side in a diametrical direction as shown by a solid line in FIG. 3.

The first flange portion 12 may be structured such as to be divided into a plurality of pieces for being easily folded.

As a result, the first gasket 112, the second gasket 122 and the third gasket 132, totally three kinds of gaskets 112, 122 and 132 respectively come into elastic contact with the inner peripheral surface 91, the first end surface 92 and the second end surface 93 of the rigid ring 9. Therefore, it is possible to securely suppress generation of a mouth opening phenomenon of the small-diameter opening portion 7, and it is possible to effectively inhibit a seal performance from being lowered in the small-diameter opening portion 7, and inhibit the sedimentation or the garbage from entering into the dust cover from an external portion.

As a material of the retainer 10, metal materials and various resin materials are appropriately selected and employed.

Further, a silicone rubber is used as the material of the first gasket 112, the second gasket 122 and the third gasket 132, totally three kinds of gaskets 112, 122 and 132.

As a result, it is possible to effectively suppress generation of the so-called mouth opening phenomenon of the small-diameter opening portion, even under a low-temperature atmosphere.

However, the material of the first gasket 112, the second gasket 122 and the third gasket 132, totally three kinds of gaskets 112, 122 and 132 is not limited to the silicone rubber, but various rubber materials can be appropriately combined and used according to a used condition, and the materials of three kinds of gaskets 112, 122 and 132 may be different from each other.

A usable rubber material can employ by appropriately selecting various rubber-like elastic materials such as FKM having a good sealing performance, a silicone rubber, EPDM, a nitrile rubber, an acrylic rubber and HNBR.

Further, a collapsing ratio in a state in which the first gasket 112, the second gasket 122 and the third gasket 132 are assembled is preferably set to a range between 10 and 35% for maintaining the seal performance.

Further, a material of the elastic dust cover 6 can be appropriately selected and used according to an intended use from rubber-like elastic materials such as chloroprene, polyester elastomer and thermoplastic elastomer such as thermoplastic polyurethane.

Further, a grease is sealed within the dust cover 6 made of the elastic material.

Figure 5:
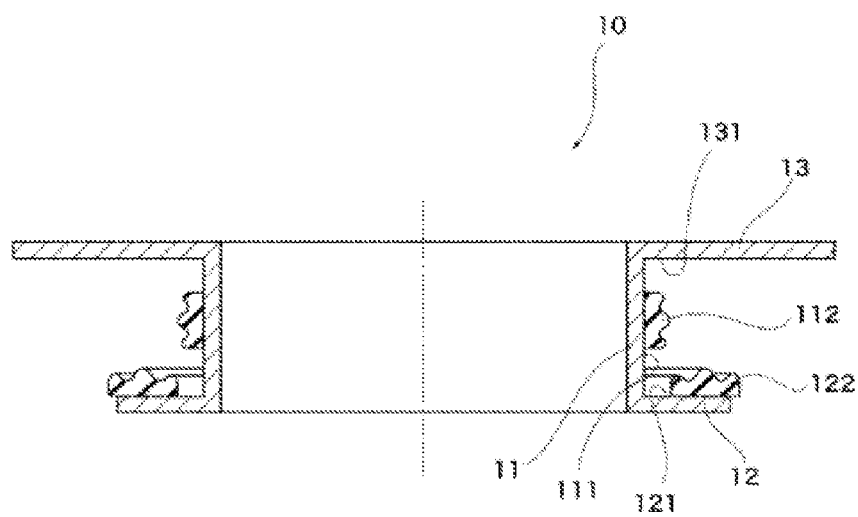
FIG. 5 is a vertical cross sectional view of a retainer according to a second embodiment of the present invention.
Figure 6:
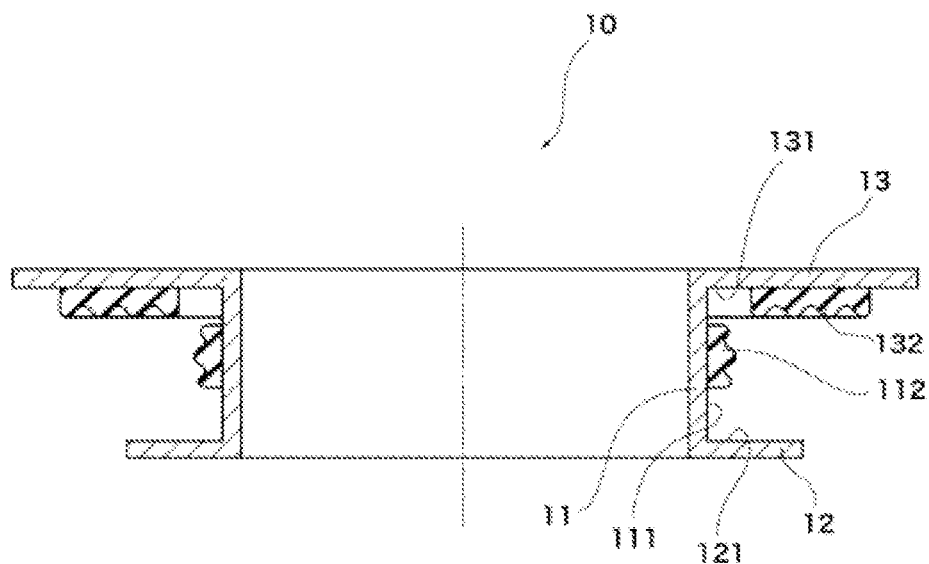
FIG. 6 is a vertical cross sectional view of a retainer according to a third embodiment of the present invention.
Figure 7:
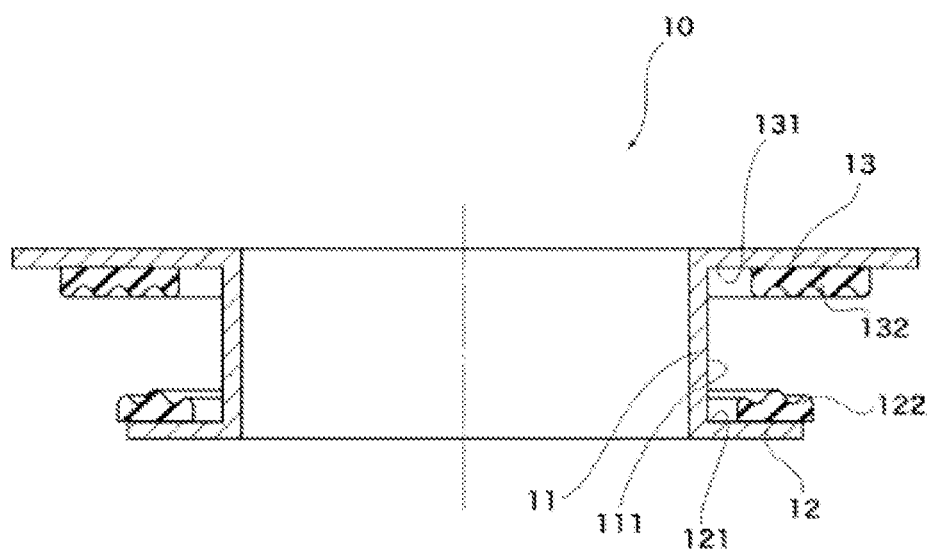
FIG. 7 is a vertical cross sectional view of a retainer according to a fourth embodiment of the present invention.

The embodiment mentioned above is structured such that the retainer 10 is provided with the first gasket 112, the second gasket 122 and the third gasket 132, totally three kinds of gaskets 112, 122 and 132, however, three kinds of gaskets 112, 122 and 132 are not necessarily provided. In any of a structure in which two kinds of gaskets including the first gasket 112 and the second gasket 122 are provided like a second embodiment shown in FIG. 5, two kinds of gaskets including the first gasket 112 and the third gasket 132 are provided like a third embodiment shown in FIG. 6, and two kinds of gaskets including the second gasket 122 and the third gasket 132 are provided like a fourth embodiment shown in FIG. 7, it is possible to effectively suppress generation of the so-called mouth opening phenomenon of the small-diameter opening portion, even under the low-temperature atmosphere.

Figure 8:
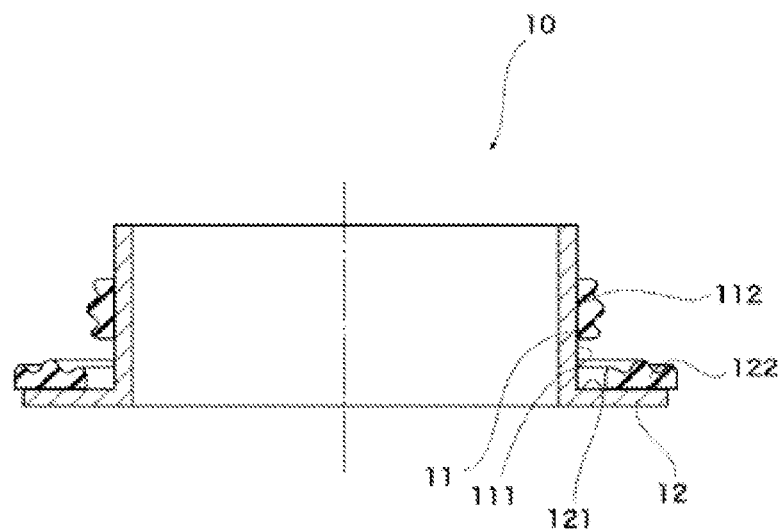
FIG. 8 is a vertical cross sectional view of a retainer according to a fifth embodiment of the present invention.

Next, a description will be given of a retainer 10 according to a fifth embodiment of the present invention with reference to FIGS. 8 to 10.

A different point from the retainer 10 described above is a matter that the retainer is formed into an L-shaped form in its cross section and a portion corresponding to the second flange portion 13 does not exist.

In other words, the retainer 10 according to the fifth embodiment has a cylinder portion 11 which is fitted and fixed to the outer peripheral surface of the shaft 4 and is provided with an outer peripheral surface 111 facing to the inner peripheral surface 92, and a first flange portion 12 which is provided with an upper end surface 121 facing to the first end surface 92, and is constructed by integrally bonding a first gasket 112 coming into contact with the inner peripheral surface 91 in a sealing manner and made of a rubber-like elastic material to the outer peripheral surface 111, and integrally bonding a second gasket 122 coming into contact with the first end surface 92 in a sealing manner and made of a rubber-like elastic material to the upper end surface 121.

According to the structure mentioned above, the retainer 10 does not require any folding process as is different from the previous embodiments, and it is easy to assemble the retainer.

Further, the rigid ring 9 is structured such that the rigid ring 9 is pinched by the retainer 10 and the knuckle 5.

Figure 9:
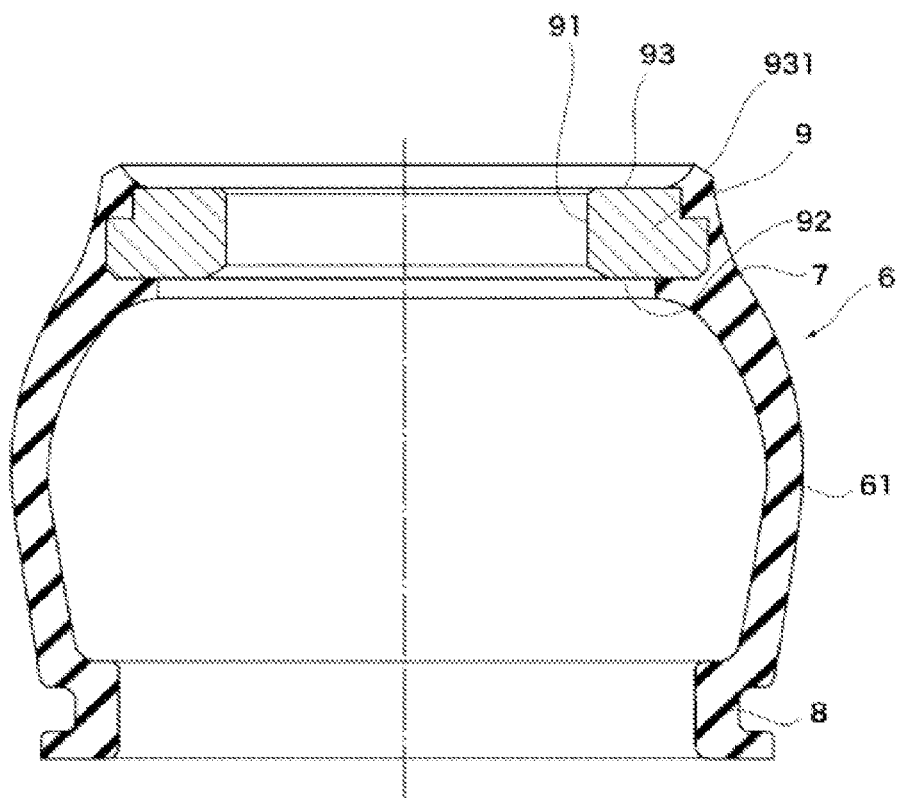
FIG. 9 is a view showing a dust cover which is assembled with the retainer shown in FIG. 8 in the same manner as FIG. 2.
Figure 10:
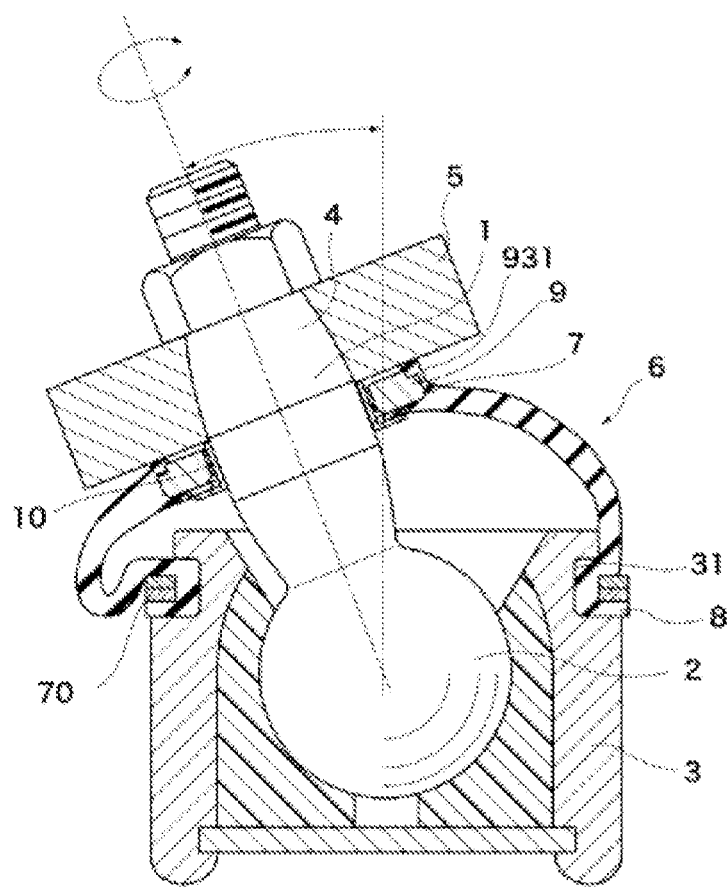
FIG. 10 is a view showing a state in which the retainer shown in FIG. 8 is assembled in the dust cover shown in FIG. 9 in the same manner as FIG. 1.
Figure 11:
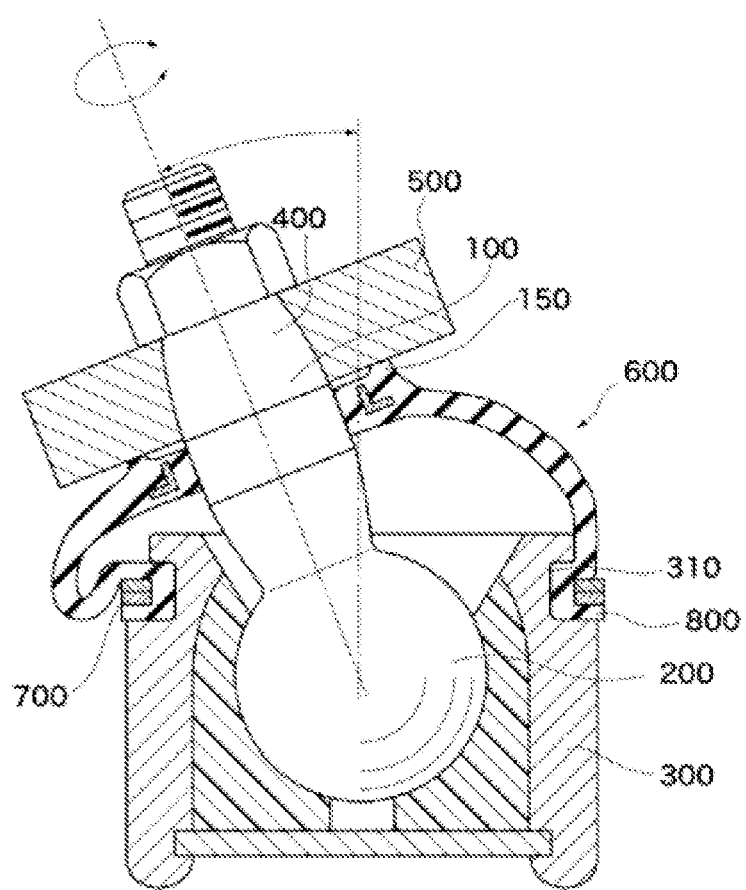
FIG. 11 is a vertical cross sectional view of a dust cover for a ball joint according to a prior art.

As a result, the sealing performance can be further enhanced by integrally bonding a dust lip 931 coming into contact with the knuckle 5 in a sealing manner and made of a rubber-like elastic material to the second end surface 93 side of the rigid ring 9 as shown in FIG. 9, it is possible to suppress generation of the so-called mouth opening phenomenon of the small-diameter opening portion 7 even under the low-temperature atmosphere, and it is possible to effectively inhibit the seal performance from being lowered in the small-diameter opening portion 7, and inhibit the sedimentation or the garbage from entering into the dust cover from the external portion.

Here, the material of the dust lip 931 may be the same material as that of the film portion 61, or may be the same material as that of the first gasket 112 and the second gasket 122.

On the other hand, the one end large-diameter opening portion 8 having the approximately C-shaped cross section in the dust cover 6 made of the elastic material is structured such as to be fixed and retained within an annular groove portion 31 which is formed in the outer peripheral surface of the socket 3, by an annular pressure ring 70.

A circlip approximately having a rectangular cross section is used for the pressure ring 70.

Further, it goes without saying that the present invention is not limited to the best mode for carrying out the invention mentioned above, but can employ the other various structures without deviating from the scope of the present invention.

INDUSTRIAL APPLICABILITY

The present invention can be used in the ball joint which is used in the suspension device and the steering device of the motor vehicle.

What is claimed is:
1. A dust cover assembly for a ball joint including a spherical head formed at one end of a ball stud and a shaft provided at the other end of said ball stud, the spherical head being retained within a socket, and the shaft being fastened and fixed to a knuckle, the dust cover assembly comprising:
   a first end large-diameter opening portion fixed and retained to an outer peripheral surface of said socket;
   a second end small-diameter portion having a rigid ring integrally formed therein, the second end small-diameter portion being retained to said shaft;
   a film portion connecting said first end large-diameter opening portion and said second end small-diameter opening portion; and
   a retainer having a cylinder portion which is fitted and fixed to an outer peripheral surface of said shaft,
   wherein the dust cover is made of an elastic material,
   wherein said rigid ring:
      has an approximately rectangular cross-sectional shape,
      has an outer peripheral surface side connected to one end of said film portion, and
      has an exposed inner peripheral surface, an exposed first end surface facing said socket, and an exposed second end surface facing said knuckle, wherein the cylinder portion of said retainer has an outer peripheral surface facing said inner peripheral surface, said retainer has a first flange which is provided with an upper end surface facing said first end surface, and said retainer has a second flange which is provided with a lower end surface facing said second end surface, wherein the retainer has at least two gaskets selected from the group consisting of:
- a first gasket which is bonded to said outer peripheral surface, sealingly comes into contact with said inner peripheral surface, and is made of an elastic material,
- a second gasket which is bonded to said upper end surface, sealingly comes into contact with said first end surface, and is made of an elastic material, and
- a third gasket which is bonded to said lower end surface, sealingly comes into contact with said second end surface, and is made of an elastic material, and wherein the first gasket pinches the exposed inner peripheral surface, the second gasket pinches the exposed first end surface facing said socket, and the third gasket pinches the exposed second end surface facing said knuckle.

2. The dust cover for the ball joint according to claim 1, wherein materials of said first gasket, said second gasket and said third gasket are silicone rubber.

3. A dust cover assembly for a ball joint including a spherical head formed at one end of a ball stud and a shaft provided at the other end of said ball stud, the spherical head being retained within a socket, and the shaft being fastened and fixed to a knuckle, the dust cover assembly comprising:

a first end large-diameter opening portion fixed and retained to an outer peripheral surface of said socket;

a second end small-diameter portion having a rigid ring integrally formed therein, the second end small-diameter portion being retained to said shaft;

a film portion connecting said first end large-diameter opening portion and said second end small-diameter opening portion; and a retainer having a cylinder portion which is fitted and fixed to an outer peripheral surface of said shaft, wherein the dust cover is made of an elastic material, wherein said rigid ring:
- has an approximately rectangular cross-sectional shape,
- has an outer peripheral surface side connected to one end of said film portion, and
- has an exposed inner peripheral surface, and an exposed first end surface facing said socket, wherein said retainer:
- has an outer peripheral surface facing said inner peripheral surface, and
- has a first flange which is provided with an upper end surface facing said first end surface, and wherein the retainer is constructed by:

bonding a first gasket to said outer peripheral surface, said first gasket sealingly coming into contact with said inner peripheral surface, and being made of an elastic material, and bonding a second gasket to said upper end surface, said second gasket sealingly coming into contact with said first end surface, and being made of an elastic material.

\* \* \* \* \*